United States Patent
Lloyd et al.

(10) Patent No.: US 9,973,498 B2
(45) Date of Patent: May 15, 2018

(54) VIRTUAL SMART CARDS WITH AUDIT CAPABILITY

(71) Applicant: Citrix Systems, Inc., Fort Lauderdale, FL (US)

(72) Inventors: David Lloyd, Cambridge (GB); Andrew Innes, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 104 days.

(21) Appl. No.: 15/196,702

(22) Filed: Jun. 29, 2016

(65) Prior Publication Data
US 2018/0007039 A1    Jan. 4, 2018

(51) Int. Cl.
*H04L 29/06* (2006.01)

(52) U.S. Cl.
CPC ...... *H04L 63/0853* (2013.01); *H04L 63/0435* (2013.01); *H04L 63/0442* (2013.01); *H04L 63/061* (2013.01); *H04L 63/0861* (2013.01)

(58) Field of Classification Search
CPC .............. H04L 63/0853; H04L 63/061; H04L 63/0442; H04L 63/0861
See application file for complete search history.

(56) References Cited

U.S. PATENT DOCUMENTS

| | | | | |
|---|---|---|---|---|
| 7,085,931 B1* | 8/2006 | Smith | .................... | G06F 21/335 713/175 |
| 2002/0031230 A1* | 3/2002 | Sweet | ................. | H04L 63/0428 380/278 |
| 2009/0037729 A1* | 2/2009 | Smith | .................... | H04L 9/3234 713/158 |

FOREIGN PATENT DOCUMENTS

| | | |
|---|---|---|
| WO | 01/18635 | 3/2001 |
| WO | 01/93212 | 12/2001 |
| WO | 2011/150450 | 12/2011 |

OTHER PUBLICATIONS

International Search Report and Written Opinion received in PCT/US2017/027620 dated Aug. 7, 2017.
Kaufman, et al., "Network Security—Private Communication in a Public World," 2nd Edition, in USA, Jan. 1, 2002, Pearson Education, USA, XP55393812, pp. 410, 450, 451, 641.

* cited by examiner

*Primary Examiner* — Ellen Tran
(74) *Attorney, Agent, or Firm* — Fox Rothschild LLP; Robert J. Sacco; Carol E. Thorstad-Forsyth (57) ABSTRACT

Virtual smart card system includes a virtual smart card server (VSS) which controls access to content respectively associated with a plurality of virtual smart cards. A remote client computer system includes a system level agent which establishes the client computer machine to the VSS as a trusted computer system. A user level agent at the client computer system responds to a request for a virtual smart card operation by causing the client computer system to obtain user authentication information, negotiate with the system level agent to obtain a cookie, and initiate a request to the VSS for the virtual smart card operation. The VSS will perform the virtual smart card operation provided that a security policy is satisfied and will communicate the results to the user level agent.

20 Claims, 8 Drawing Sheets

VIRTUAL SMART CARDS WITH AUDIT CAPABILITY

BACKGROUND OF THE INVENTION

Statement of the Technical Field

This document concerns methods and systems for authentication, encryption and data storage. More particularly, this document concerns methods and system to facilitate such enterprise level functions that are commonly implemented using smart cards.

Description of the Related Art

A smart card is a pocket-sized card that contains an embedded electronic circuit (e.g. a secure microcontroller with internal memory) which can be read by a reader device by means of direct physical access or radio frequency signaling. Smart cards have many uses which range from encryption to authentication. Smart cards have the ability to store small amounts of data and can be designed to perform certain on-card processing functions. To facilitate such interactions, a conventional smart card is designed to interact with a hardware element which is commonly referred to as a smart card reader.

Many companies have strict requirements for auditing processes such as financial transactions and document approval. They need to know which employees authorized which steps and when. Similarly the employees need to have a full understanding of the transaction they are approving and must be able to control the use of their credentials for this purpose. To facilitate these processes, a smart card can be issued to an employee for authentication and signing purposes. In such scenarios, the smart card may contain a private key for use in connection with a conventional public key infrastructure (PKI) scheme. The smart card may be used in conjunction with a personal identification number (PIN) passcode, or fingerprint reader to validate the user.

As an alternative to the use of smart cards, digital certificates for the purposes described herein have been issued directly to end users using "software certificate" support. In such implementations, a private key for use in a PKI system has been conventionally stored in the user's roaming profile. As is known, a roaming user profile is a feature of certain computer operating systems whereby a user can log on to any computer on the same network and access their documents as well as other data (such as digital certificates and/or private keys). But the user has no control over the private key, and it can be very easy for hackers to "steal" the key.

A conventional smart card provides certain advantages over systems which utilize certificates and private keys that are associated with a roaming user profile. For example, the smart card facilitates a hardware-based solution that is better at protecting the private key from being copied. Still, a smart card can be susceptible to loss/theft and may be used without authorization if the user's PIN can be deduced. Once physical control over a token such as a smart card is lost, it is hard for an enterprise to ensure that the key is not going to be used for unauthorized purposes. For example, such a situation may arise in scenarios where a smart card is not returned by an employee on termination.

Another challenge when using conventional smart cards is that they can hinder an auditing process which may be needed to reconstruct or track when and how a particular person's credentials have been used in connection with various transactions. Systems using smart cards can be designed to facilitate auditing, but these systems tend to be proprietary or built into different applications. Accordingly, it may not be possible to unify auditing, or some applications may not log all the appropriate information.

SUMMARY OF THE INVENTION

Embodiments of the invention concern a virtual smart card system. The system includes a first computer machine comprising a virtual smart card server (VSS). The VSS controls access to content respectively associated with a plurality of virtual smart cards. One or more second computer machines is/are disposed remote from the VSS. Each of the second computer machines is a client computer system which includes a system level agent. The system level agent initiates a machine authentication protocol of the client computer machine at the VSS to establish the client computer machine to the VSS as a trusted computer system. Once so established, a user level agent at the client computer system receives a request for one or more virtual smart card operations. For example, the request can be initiated by an application program executing on the client computer machine.

The user level agent is responsive to each such request so as to cause the client computer system to perform certain operations. These include obtaining from a user of the client computer system user authentication information necessary to permit use of the virtual smart card operation. These operations can further include negotiating with the system level agent to obtain a cookie from the VSS. Thereafter, the user level agent will initiate a request to the VSS for performing a particular virtual smart card operation. The request will involve communicating the user authentication information and the cookie to the VSS. The VSS is configured so that it is responsive to each request so as to selectively perform the virtual smart card operation, provided that a security policy applicable to the requested virtual smart card operation is satisfied. Once the particular virtual smart card operation is complete, the VSS will communicate the results of the virtual smart card operation to the user level agent. The user level agent will in turn provide the results of the virtual smart card operation to the application program which initiated the request for the virtual smart card operation. The VSS is configured to record in a data-log information concerning a plurality of events pertaining to each request for a virtual smart card operation for subsequent audit purposes.

Embodiments also concern a method for controlling use of one or more private keys in the context of a public key infrastructure (PKI) scheme. The method can involve storing a plurality of the private keys in a secure data store which is accessible only to a VSS. Thereafter, a system level agent at a client computer machine remote from the VSS is used to initiate a machine authentication protocol of the client computer machine at the VSS. This process establishes the client computer machine to the VSS as a trusted computer system. A user level agent at the client computer machine can receive one or more requests for private key operations. For example, such a request may be generated by an application program executing on the client computer machine. In response to a particular request, the user level agent will obtain user authentication information from the user and negotiate with the system level agent to obtain a cookie from the VSS. The user level agent will also initiate a request to the VSS for the private key operation and will communicate the user authentication information and the cookie from the user level agent to the VSS. In response to the request, the VSS will selectively perform a private key operation requested by the user level agent using a private key assigned to the user, provided that the authentication information satisfies an applicable security policy.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

A smart card is a pocket-sized card that contains an embedded electronic circuit (e.g. a secure microcontroller with internal memory) which can be read by a reader device by means of direct physical access or radio frequency signaling. In some scenarios, a smart card can contain a digital certificate in connection with a public key infrastructure (PKI) scheme. An exemplary digital certificate of this kind is a digital certificate issued in accordance with a known PKI standard, such as X.509. As is known, such a digital certificate can be used to bind an entity's public key to a specific attribute relating to its owner (e.g. an organization or a person). The conventional smart card may also include information concerning a private key assigned to a particular user. The digital certificate and private key on the smart card are used by an individual (e.g. an employee of an enterprise) for various purposes. For example, these elements can be used for signing and authentication purposes when a user is signing documents or approving transactions. They may also be used for secure document processing, and/or cryptographic communications among other applications.

But smart cards suffer from various limitations and problems. The card can be forgotten, lost or stolen and in such scenarios, a central administrator has only limited visibility as to where the smart card may end up. Also, if a smart card is lost or stolen, key information stored on the card can only be invalidated by an administrator and cannot be remotely deleted. Another problem with a conventional smart card arises when an employee leaves their smart card at home in the morning. Without the smart card assigned to them, an employee may be unable to perform their job. Smart cards also usually cannot be "shared among a group". Each smart card must be assigned to an individual, so for example, if a team of four people needs to be expanded to six to handle a sudden busy schedule, two additional smart cards will need to be provisioned for this purpose and then de-provisioned once the busy period is complete. Finally, a computer system using a smart card can facilitate certain audit functions, but it can often be very difficult for a central administrator to perform an audit to determine when and where a smart card has been used.

Accordingly, there is disclosed herein a method and system to facilitate the use of one or more virtual smart cards respectively by each of one or more users. The embodiments described herein overcome many limitations associated with conventional smart cards while retaining all of the benefits thereof. A user can authenticate their identity to a secured computer system. Thereafter, appropriate certificates and private keys (which the user has some authorization to use) can be securely generated or accessed on a remote central server.

The remote central server is a centralized virtual smart card server which can advantageously have access to a Certificate Authority so that the server can generate various types of certificates for users. As is known, a certificate authority is an organization that will verify the identity of an entity and attest to such identity by digitally signing the entity's digital certificate. All certificates and private keys are stored securely on the virtual smart card server, possibly using a "Hardware Security Module" to manage keys so that it would be extremely difficult for an attacker to gain access to the private keys. In some embodiments, the server can be held in a secured location to maintain physical security over the server. Each user is authenticated by the server according to a preconfigured policy which has been established to permit use a particular virtual smart card. The authentication mechanism could be username/password, Security Assertion Markup Language (SAML) authentication, biometric, or any other suitable method. A different authentication requirement or security protocol can be defined for user access to each of several different virtual smart cards that may be stored on the server for that particular user.

When one of the virtual smart card assigned to a particular individual is to be used, carefully controlled informed consent and authentication prompts are displayed to the user at the secured computer system. The prompts can be displayed whenever the user needs to utilize one of the virtual smart cards for some purpose (e.g. to approve a particular transaction or process). The virtual smart card server will authenticate the user to whatever level is appropriate for the security policy applied to use of the particular virtual smart card. This potentially will include information such as: the username, the location, the time, which application is being used, etc. If required by authentication policy, the server can also request a "proof-of-presence" authentication—so the end user may need to respond to a challenge (enter your password, insert a smart card, use the fingerprint reader).

Once the user authenticates to a secured computer system, appropriate certificates (i.e., virtual smart cards) can be exposed to applications that the user has access to by using standard computer operating systems APIs. The use of standard operating system API's facilitates compatibility with the widest selection of applications. Whenever the smart card is to actually be used (e.g. when the user needs to approve a transaction or a process), carefully controlled informed consent and authentication prompts are displayed to the user.

To ensure greater security, the user's private keys (which are associated with their virtual smart cards) advantageously never leave the remote central server. So even if the user is allowed to use the various private keys, she will never be allowed direct access to them. Each use of each private key available to the user is delegated to the centralized virtual smart card server. The central server is therefore able to create secure audit logs of every use of each private key. Moreover, if an anomaly is detected (for example a malicious employee may have been terminated), the remote central server can immediately terminate access to the private keys assigned to such user in response to a command from an administrator. There is no delay in this taking effect.

Figure 1:
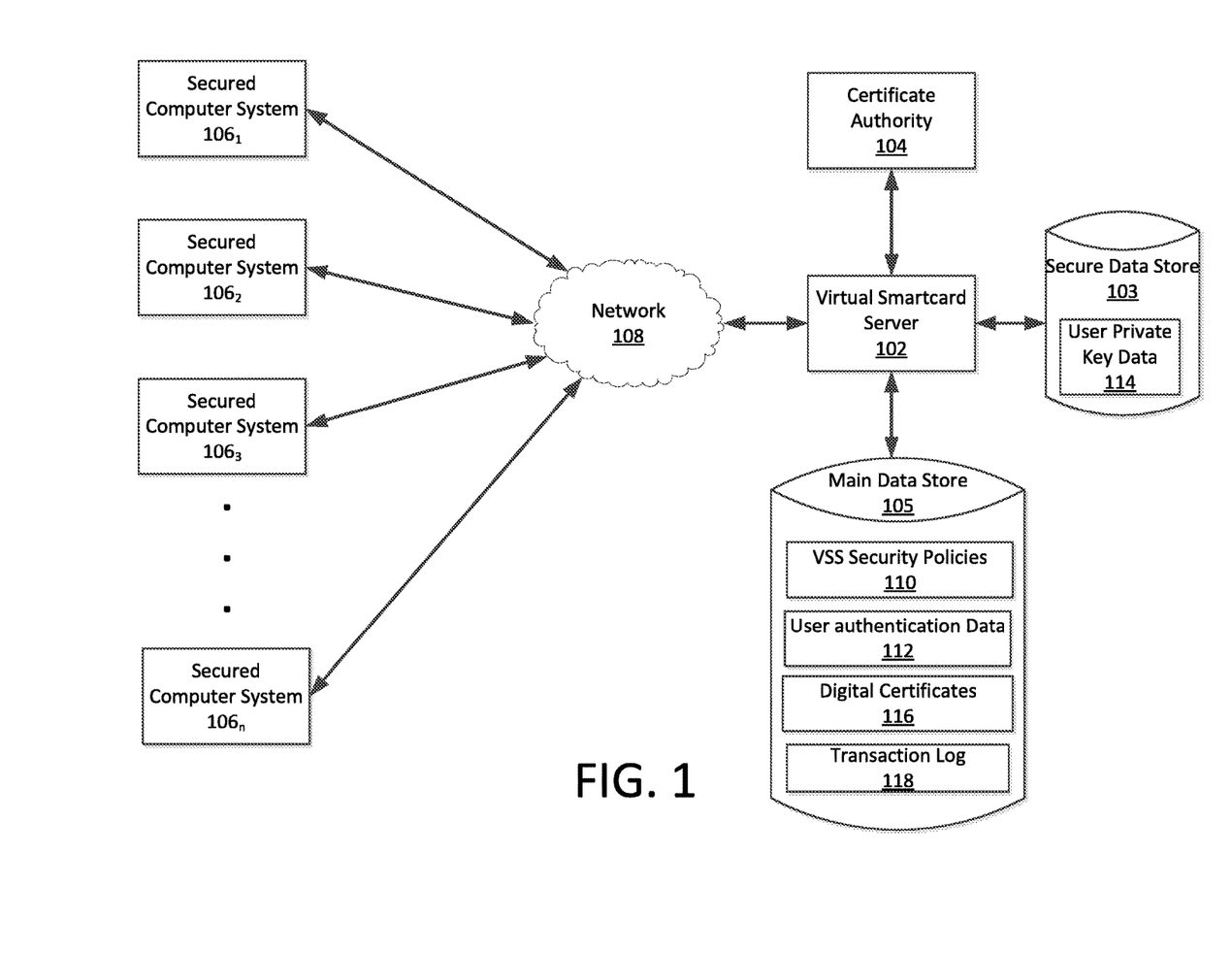
FIG. 1 is a system diagram that is useful for understanding an embodiment virtual smart card system as described herein.

Shown in FIG. 1 is a system diagram that is useful for understanding an embodiment virtual smart card system as described herein. For convenience, certain embodiments described herein are disclosed in the context of one or more virtual smart cards comprising private key information (e.g., private key information which can be used in the context of a PKI scheme). However, it should be appreciated that the virtual smart card system described herein is not limited in this respect and may instead by used in connection with any content or functionality which may be provided in a conventional physical smart card.

The system in FIG. 1 includes a Virtual Smart card Server (VSS) 102 which has access to a Certificate Authority (CA) 104, a secure data store 103, and a main data store 105. One or more secured computer systems $106_1$-$106_n$ communicate with the VSS using a computer data network 108. The VSS 102 can comprise a computer program and associated computer hardware that provides virtual smart card services to the client secured computer systems $106_1$-$106_n$.

The secure data store 103 can contain private key data 114 pertaining to one or more private keys which have been assigned or issued to individual users. In some embodiments, the secure data store 103 can be a Hardware Security Module (HSM) which is specifically designed to store digital keys. Accordingly, the secure data store 103 can be a plug-in card or external device that connects to the VSS.

The main data store 105 can contain one or more VSS security policies 110 which define conditions and requirements imposed by the VSS when determining whether to permit use of the private keys. The main data store can also contain user authentication data 112, digital certificates 116, and a transaction log 118. The transaction log 118 is used by the VSS to record transactions involving private key operations as described herein for subsequent audit purposes.

Computer data network 108 is suitable to facilitate communication of files, data and other types of information necessary to implement the virtual smart card system as described herein. Computer network 108 can also facilitate sharing with secured computer systems $106_1$-$106_n$ certain computing resources that are available at VSS 102. Exemplary networks which can be used for this purpose can include packet data networks operating in accordance with any known communication protocol. The organizational scope of such network can include one or more of an intranet, an extranet, and the Internet.

Figure 2:
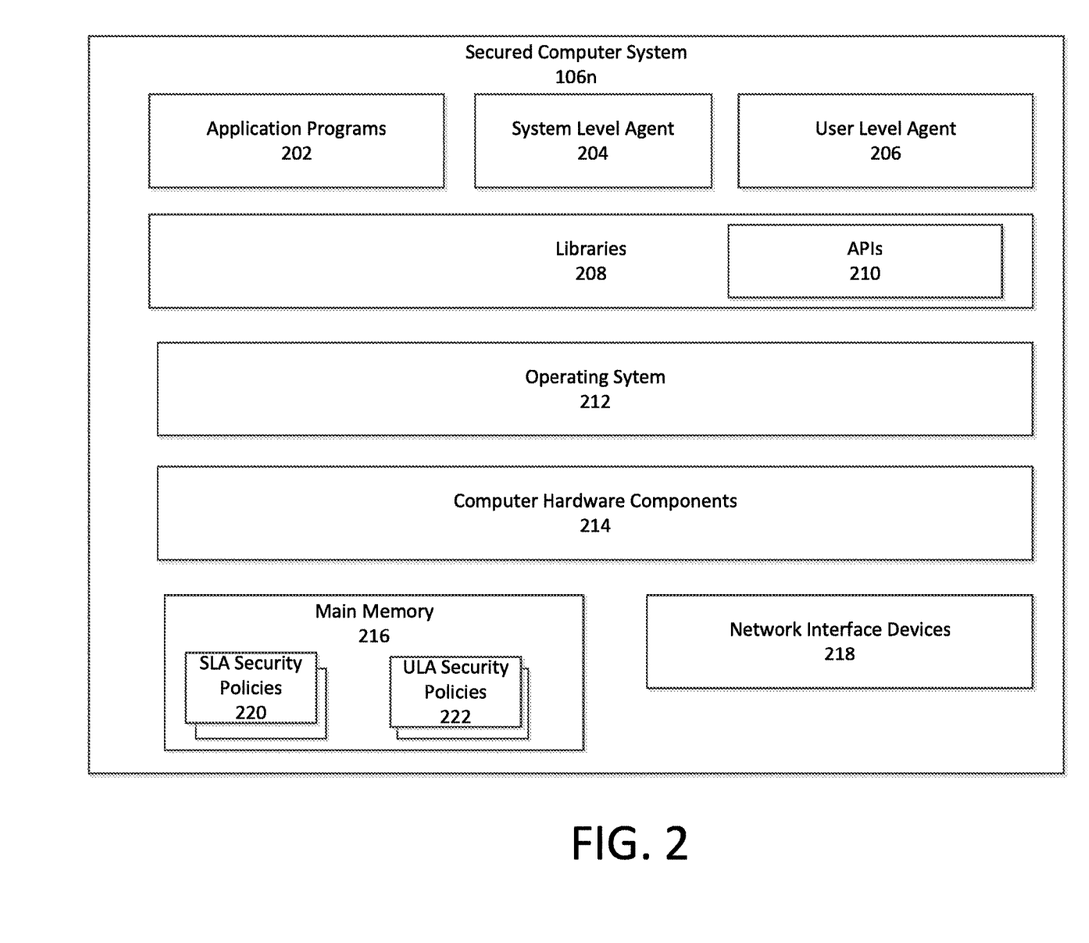
FIG. 2 is an architectural diagram that is useful for understanding certain components of a secured computer system.

Referring now to FIG. 2 there is illustrated an architectural diagram that is useful for understanding certain components of a secured computer system $106_n$. The secured computer system can comprise computer hardware components 214 (e.g. a central processing unit or CPU), main memory 216 and certain network interface devices 218 to facilitate the network communications described herein. The secured computer system can also include an operating system 212 to manage the hardware and software resources available on the secured computer system. The operating system 212 can facilitate access to libraries 208 of precompiled routines or functions that are available for application programs 202 to use. The various functions and routines provided within the libraries can be exposed to the applications using one or more application programming interfaces (API) 210.

A secured computer system $106_n$ further comprises a system level agent 204 and a user level agent 206. The system level agent 204 and the user level agent 206 are computer programs which perform certain security and authentication related functions in the secured computer system to facilitate use of the virtual smart cards described herein. Each of these agents is also involved in certain communications with the VSS 102. The system level agent 204 is primarily involved in authentication operations with respect to the secured computer system $106_n$. The user level agent is primarily involved in authentication with respect to a user of the secured computer system $106_n$. The system level agent is instantiated during a startup process for the secured computer system. A user level agent 206 is advantageously instantiated for each user logged into a secured computer system $106_n$. The user level agent 206 which is instantiated for a user is trusted by the system level agent 204 to operate on the behalf of that user.

The main memory 216 can contain one or more defined security policies which are configured to control the security policies which are applied for permitting use of one or more virtual smart card (e.g., virtual smart cards containing private key information) as described herein. For example, the main memory can contain a plurality of system level agent (SLA) security policies 220 which define the security policies to be applied by the system level agent 204 for use of each virtual smart card. Similarly, the main memory can contain a plurality of user level agent security policies 222 which define the security policies to be applied by the user level agent 206 for use of each virtual smart card.

According to one aspect, a user level agent 206 authenticates a user directly to the VSS 102. But each time it does so, it must also first negotiate with the system level agent 204 to obtain a one-time cookie. The system level agent 204 responds by obtaining the one-time cookie from the VSS 102 and provides it to the user level agent 206. Consequently, the VSS, the system level agent 204, and the user level agent 206 are all aware of what authorizations or private key actions are being performed. The operations of these entities will be described in further detail below and their purpose will become more apparent as the discussion progresses.

Figure 3:
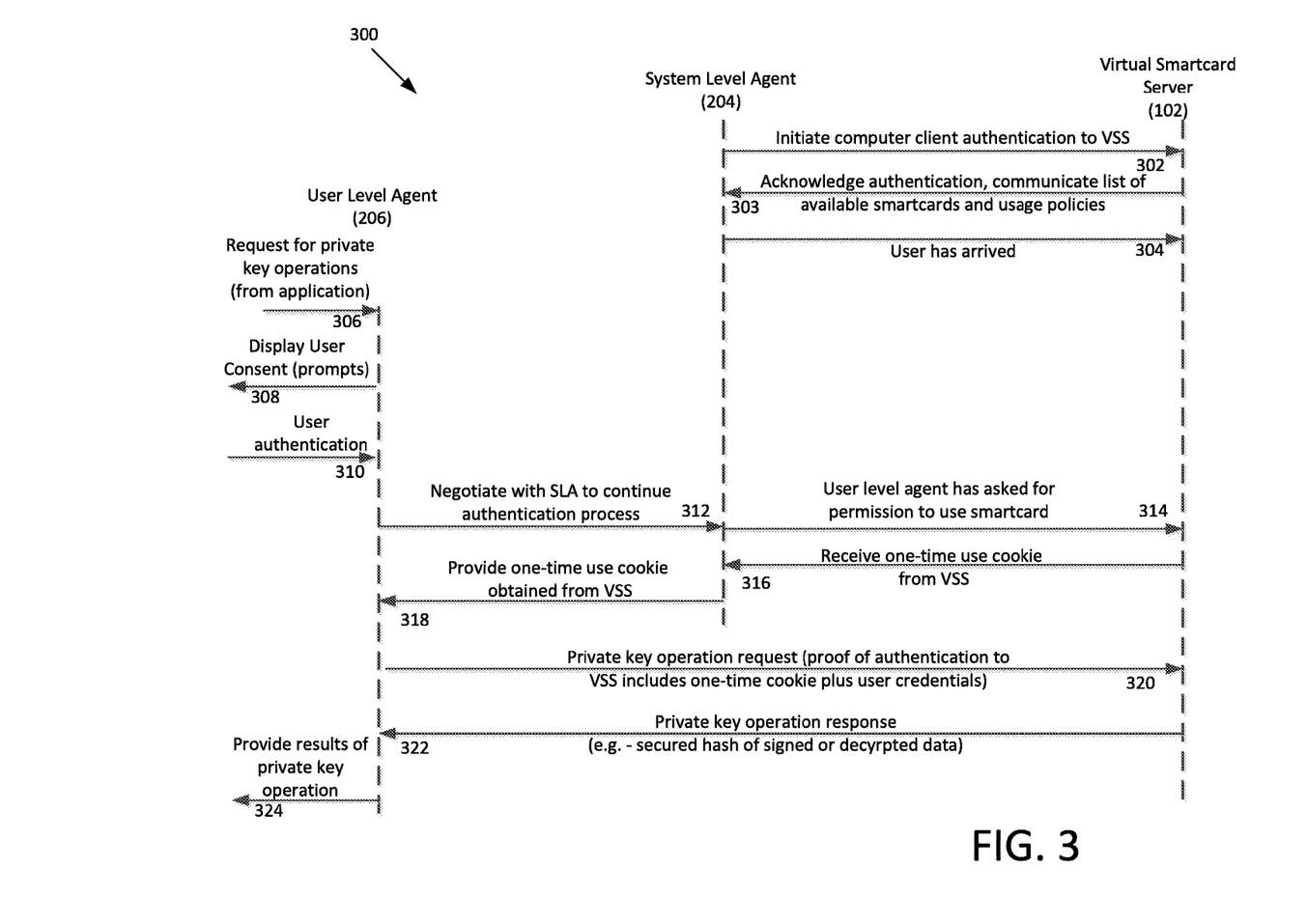
FIG. 3 is a diagram that is useful for understanding certain communications among various components of a virtual smart card system.

Referring now to FIG. 3 there is shown a communication diagram that is useful for understanding certain interactions among various components of a virtual smart card system. These interactions can include communications between VSS 102 and various entities comprising a secured computer system (e.g. secured computer system $106_n$) including the system level agent 204 and the user level agent 206. Some of these interactions are described in further detail in relation to FIGS. 4A-4B and 5A-5B. For greater clarity, the use of only a single virtual smart card is described in the communications which are shown in FIG. 3. Still, it should be understood that a user, during a particular session in which he logged onto a secured computer system, can similarly access one or more authorized virtual smart cards from the VSS 102. Each of these different virtual smart cards can have different purposes and in some embodiments can be accessed in accordance with different security policies.

A communication session 300 can begin when a system level agent 204 communicates at step 302 to initiate a secure computer client authentication to the VSS. This process can involve identifying the secure computer system $106_n$ to the VSS using a suitable authentication protocol. This process can also involve a communication 303 from the VSS to the system level agent to indicate that authentication has been acknowledged or completed. Communication 303 can also comprise a list of smart cards and appropriate usage policies that are available. This list of smart cards and appropriate usage policies are then stored by the system level agent 204 at the secured computer system for later usage.

An exemplary machine authentication protocol that can be used for the purposes described herein can include the well-known Kerberos identification protocol whereby both the secure computer system 106n and the VSS 102 would each verify the identity of the other. Alternatively, a conventional Transport Layer Security (TLS) client authentication protocol can be used for this purpose. The exact process used for machine authentication in this step is not critical provided that each of the secure computer system and the VSS 102 is able to authenticate the identity of the other machine. Accordingly, any suitable machine authentication process which is now known or known in the future can be used. It should be appreciated that additional communications with other computer systems can be involved in the machine authentication process, depending on the particular authentication protocol that is used. For example, such communications can involve communications to a trusted authority server. For purposes of clarity, these additional steps are intentionally omitted in FIG. 3.

Once the machine authentication process is completed at 303, the VSS will thereafter trust and accept requests from the particular system level agent 204. When a user logs on to a secure system computer $106_n$, the system level agent 204 informs 304 the VSS 102 that the user has arrived. This allows the VSS to ensure that appropriate virtual smart cards are available for use by that user. The system level agent also instantiates a user level agent 206 for that user. At this point, the user can begin processing operations using one or more application programs 202.

At a certain point in time, these processing operations can require certain private key operations (e.g. private key operation which are conventionally handled by use of a private key stored on a physical smart card). Exemplary private key operations can include authentication operations, signing operations, process approval operations, and/or cryptographic operations. One or more such operations can involve the use of a private key in the context of a PKI scenario. When such an event arises in connection with one of the application programs 202, the application program will initiate a request 306 for a private key operation. For example, to initiate such operations, the application can communicate a request to one or more standard operating system API's 210 which are available on the secured computer system $106_n$.

In response, the user level agent 206 will display one or more user prompts at 308 to request user consent for use of a particular virtual smart card as disclosed herein. These consent prompts can involve actions involving a user authentication 310. Each user in the system is authenticated according to a configured policy which has been defined for use of a particular one of the one or more virtual smart cards assigned to them. In this regard it should be noted that different virtual smart cards which have been assigned to a particular user can have different security policies attached them. Accordingly, the user authentication mechanism in a particular instance could involve one or more of a username/password combination, SAML authentication, or biometric authentication as may be appropriate to the security policy in place for use of a particular virtual smart card. In some scenarios, a physical smart card can also be used as part of this authentication process. So the user responds to the prompts by providing the authentication information at 310.

Ultimately, the user level agent 206 will need to communicate with the VSS for carrying out the private key operations which have been requested by a particular application program at 306. However, before it can do so, it must negotiate 312 with service level agent (SLA) 204 to receive a one-time use cookie. The one-time use cookie can be comprised of a small data file (such as a text file) which may be encrypted. The one-time use cookie (as its name implies) is valid for authorizing only a single private key operation. These actions ensure that the system level agent 204 is always aware when a user level agent is engaged in a virtual smart card transaction. The system-level agent 204 responds to the user level agent 206 by informing 314 the VSS 102 that the user level agent 206 has asked for permission to use a virtual smart card. This action alerts the VSS to the transaction and results in the VSS providing at 316 a one-time use cookie to the system level agent 204. The system level agent receives this one-time use cookie and provides it at 318 to the user-level agent 206.

At this point, the user level agent has all of the elements needed for requesting a private key operation from the VSS. It has the user authentication information received at 310 and it has the required one-time use cookie that permits it to obtain a private key operation from the VSS. Accordingly, the user level agent 206 initiates at 320 a request for a private key operation. This request can include information comprising the one-time use cookie and user authentication data obtained at 310. The VSS 102 will receive this information and evaluate same to determine whether the requested private key operations should be performed. If so, the VSS will perform such private key operations and communicate 322 the result to the user level agent 206. For example, the results may include a secured hash of a signed document and/or data that has been decrypted using the private key. Once these results are received at the user level agent, they are provided at 324 to the application program 202 that initiated the request for the private key operation.

Figure 4A:
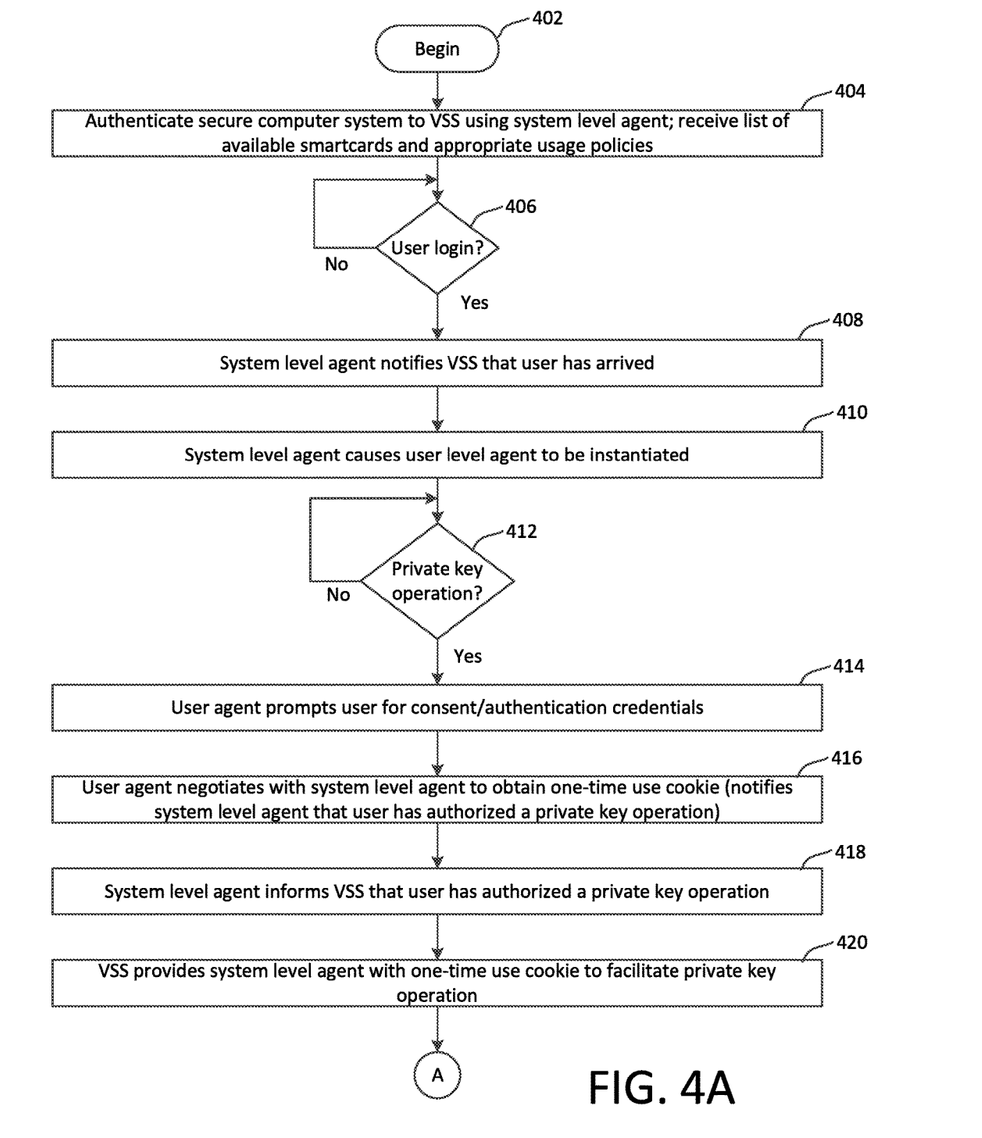
FIG. 4A and 4B comprise a flowchart which illustrates an exemplary method for accessing a virtual smart card at a secured computer.
Figure 4B:
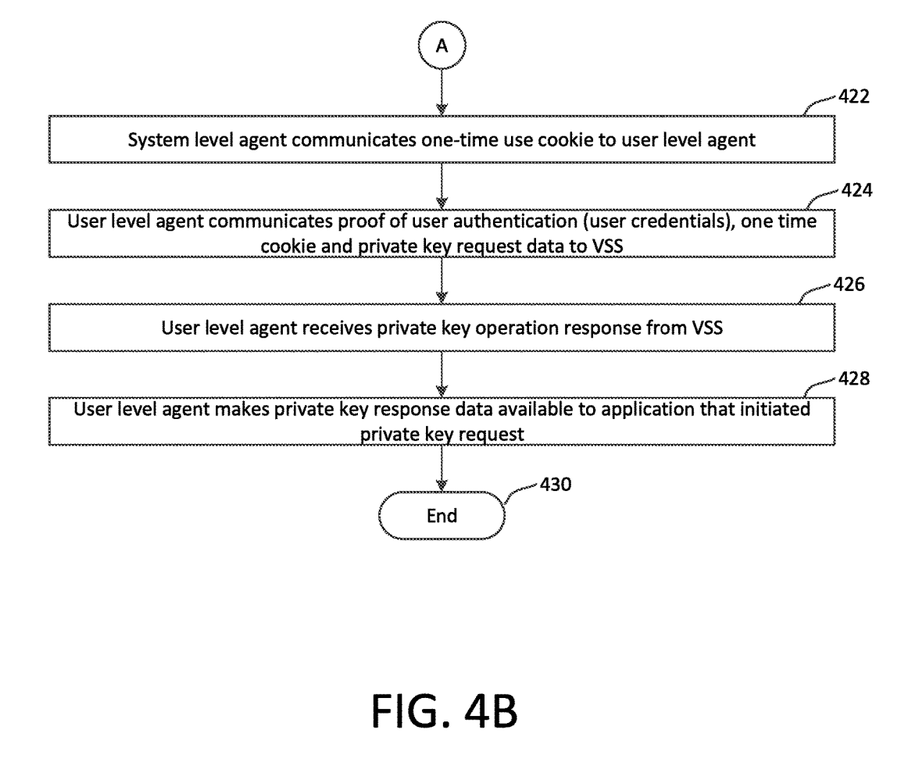

Referring now to FIG. 4A and 4B, a flowchart is provided to illustrate an exemplary method for a virtual smart card system at a secured computer 106n. The process begins at 402 and continues to 404 where a secure computer system is authenticated to the VSS by the system level agent. This step can also involve receiving from the VSS at the secure computer system a list of available smart cards that should be made available to the various application programs that are installed at the secure computer system. This information is stored at the secured computer system and can be accessed by the user level agent 206. When a user logs into the secure computer system at (406: Yes), the system level agent will be notified. The system level agent will in turn notify the VSS at 408 that the user has arrived. Further, the system level agent will cause a user level agent to be instantiated at 410. The user can thereafter utilize one or more application programs which are available at the secure computer system.

At a certain point in time, an application program in use on the computer system may require a private key operation (412: Yes). At such time, the request for the private key operation will be directed to the user level agent. To better understand this process it should be noted that in certain well-known operating systems (e.g. Windows based operating systems), the public keys and certificates are placed in the "User's Certificate store" with a reference to a private key. Similarly a smart card database in a secured computer system will contain a list of smart card readers and "known" smart cards with references to certificates and cards. The user level agent makes sure that the locations of the private keys are "kept up to date" (this happens periodically in case it becomes necessary to switch smart cards on-the-fly). Also, some smart cards may be restricted so that they can be used only in certain locations (e.g. "only in the office") so the user would be prevented from the use of such smart card if working from a laptop in a coffee shop. In embodiments described herein, applications programs will use the smart card database and certificate store as usual, but the list of stored "references" cause the user level agent 206 to be invoked for purposes of gaining access to the private key.

When the user level agent receives a request for a private key operation at 412, it will initiate a prompt (e.g. a prompt displayed on a user display screen) at 414 which will request the user to provide consent to perform the private key operations. This request can also comprise a request for certain user credentials. For example, the user may need to respond to a challenge (enter your password, insert a smart card, use the fingerprint reader). The user level agent described herein is advantageously responsible for managing certain "usability" features of a virtual smart card. For example, it may be decided that a user should only be prompted once for a particular application to use a virtual smart card, or possibly once every five minutes.

Once the necessary consent and any required credential data are obtained, the user level agent will negotiate 416 with the system level agent to obtain a one-time use cookie. This process will also serve as notification to the system level agent that the user is involved in a request for a private key operation. The system level agent is also responsible for logging and auditing operations at the private machine. Accordingly, the system level agent can make a suitable log entry each time that the user initiates a request for a private key operation. This can later be cross-checked against the central records held at the VSS.

At 418 the system level agent informs the VSS that the user has authorized a private key operation and the VSS responds at 420 by providing the required one-time use cookie. The system level agent communicates the one-time use cookie to the user level agent at 422, thereby enabling the user level agent to seek a private key operation directly from the VSS. More particularly, at 424, the user level agent communicates the necessary authentication data, one-time use cookie and private key request data to the VSS. In addition to the user's credentials (e.g., password, biometric scan data) the authentication data can include information such as: the username, the location where the authentication operation is being requested, the time of the authentication request, which application program initiated the request, and so on. If the private key operation is approved at the VSS, the user level agent will subsequently receive at 426 a private key operation response from the VSS. The user level agent will then at 428 make the private key response data available to the application that initiated the request. Thereafter, the process can end at 430 or can continue.

The operations are the VSS will now be described with reference to FIGS. 5A and 5B. The process begins at 502 and continues to 504 where the VSS receives a request initiated by a system level agent at a remote computer to participate in a computer system authentication process. The process continues at 506 where the VSS engages in the authentication process with the client computer system. Exemplary machine authentication protocols that can be used for this purpose can include the well-known Kerberos identification protocol or a conventional Transport Layer Security (TLS) client authentication protocol. At 508 a determination is made as to whether the authentication process has been successful. If so (508: yes), the process continues on to 512 whereby the remote client computer is thereafter listed at the VSS as a trusted computer system. If the authentication process fails, the authentication request is rejected at 510 and the process returns to 504 for handling the next request.

At a subsequent point in time the VSS may receive 514 a new user notification from the system level agent at the remote client computer system. When such a notification is received, the VSS can prepare 516 the particular user's virtual smart cards for private key operations. For example, these operations may involve retrieving the private key data 114 associated with one or more of the user's virtual smart cards from a secure database. In general, the private key data will be stored in the secure data store 103. Alternatively, the private key may be stored encrypted on a main data store 105 in which case it can be imported into the secure data store 103 when it is to be used. If the user has not used the system before, the VSS may be authorized to perform "certificate provisioning". This is an automated version of the steps that a system administrator goes through when issuing a smart card to a user. Effectively the VSS is trusted in the same way as a system administrator to enroll new smart cards and certificates for certain groups of users. This is done by integrating the VSS as a Registration Authority to a central Certificate Authority.

The VSS can also log the occurrence of the user's presence or log-in at the remote client computing system in a transaction log 118. Thereafter, the VSS can perform other actions while it waits at 518 for a private key request to be received from the system level agent executing at the remote client computer system. A private key request from the system level agent will serve as an indication that a user is attempting or seeking to perform a private key operation. If a request is received (518: Yes) then the VSS will generate a one-time use cookie. This cookie is then communicated at 520 to the system level agent at the remote client computer system which initiated the request. The VSS can also log the cookie generation and delivery event for auditing purposes.

It should be noted that the VSS is not limited to performing logging operations with regard to the particular events described herein. Instead, the VSS can log a wide variety of events and data which may be deemed pertinent with regard to auditing and logging of virtual smart card usage. For example, the VSS can log the particular virtual smart card being used, the virtual smart card operation being performed (e.g., signing or decrypting), the particular application program which is using the virtual smart card at the secure computer system, the user who authorized the request to use the virtual smart card, the secure computer system where authorization occurred, and the location where user first logged in.

The process continues at 522 where the VSS waits for a private key operation request to be received from a user level agent at the remote client computer. The VSS may perform other operations while it awaits such a request. If a private key operation request is received (522: Yes) then the process continues on to 524 where the authentication information provided is evaluated by the VSS. This evaluation process can involve comparing the user authentication information to user authentication data 112 contained in a secure database. The VSS can also log the evaluation event in a transaction log 118 for future audit purposes.

The VSS can have one or more sets of security policies 110 which can be selectively applied for controlling authorization to use different virtual smart cards. If the user credentials are not accepted (526: No), then the private key operation request is rejected and the event is logged at 528. In such scenarios, the process can optionally return to 522 to wait for the user authentication data to be received. But if the user credentials are accepted (526: Yes) then the VSS can perform at 530 certain private key operations requested by the user level agent at the remote client computer system. These private key operation performed at the VSS can include for example generating a secured hash of signed or decrypted data which has been communicated to the VSS.

Thereafter, the process continues at 532 whereby the result of the private key operation (e.g., a secured hash of signed or decrypted data) is communicated to the user level agent at the remote client computer system. This event can also be logged by the VSS for future audit purposes. The process can thereafter end at 534 or can continue.

Most conventional smart cards are hard coded for RSA or Elliptic Curve private keys. Accordingly, the methods and systems described herein can be used to facilitate signing and authentication using private keys (i.e., by performing private key operations at the VSS server). But it should be appreciated that embodiments are not limited in this regard. Conventional smart cards can be loaded with any program that will fit within the limited memory available on them. The most advanced types of conventional smart cards can run fingerprint matching or iris scan algorithms on the card. Accordingly, in various embodiments disclosed herein aspects of such operations can instead be performed by a virtual smart card at the VSS. In fact, a the virtual smart cards described herein can be used to provide any functionality that a physical smart card can, but at a greatly reduced cost.

Figure 5A:
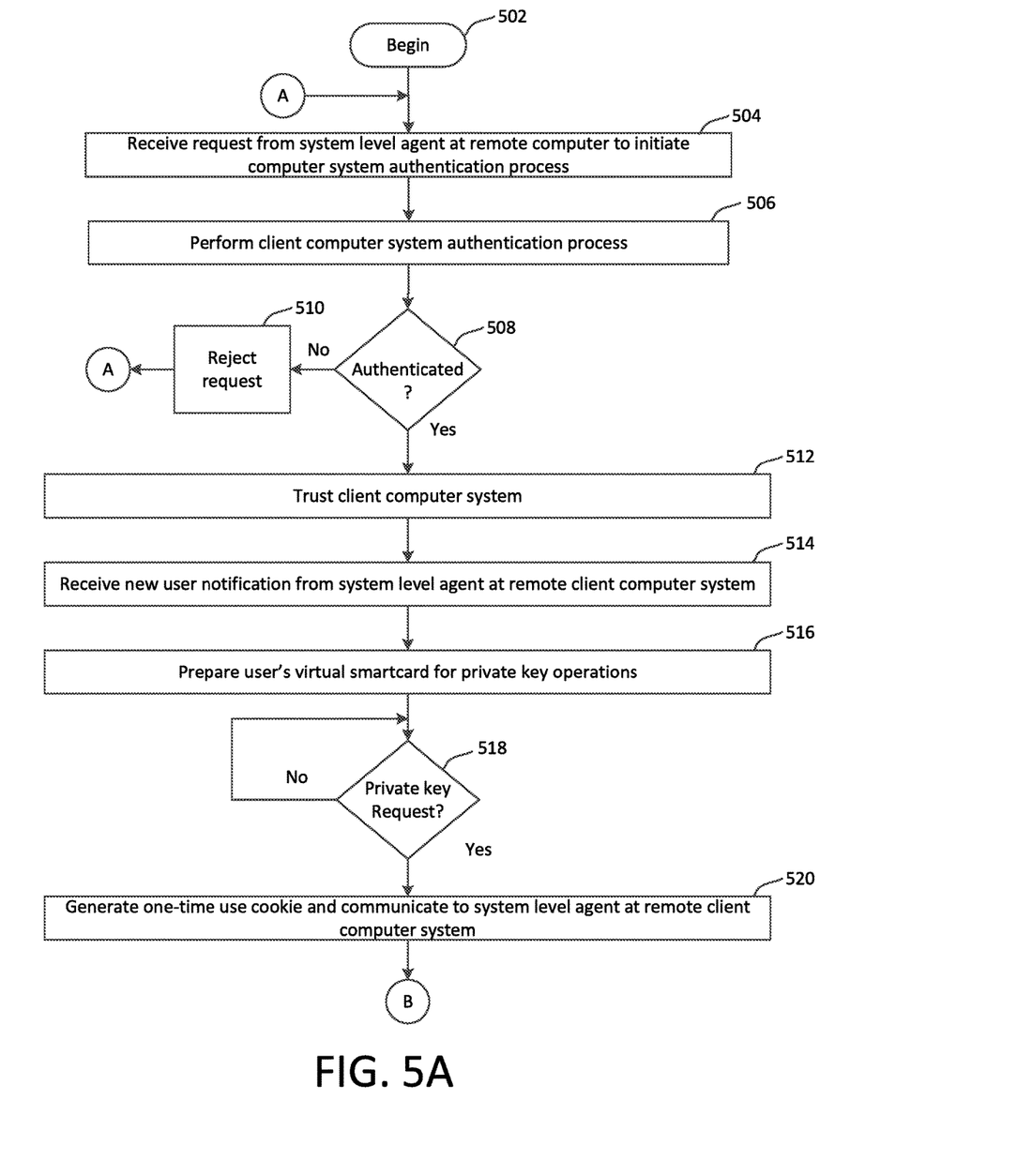
FIGS. 5A and 5B comprise a flowchart which illustrates an exemplary method for providing access to a virtual smart card at a virtual smart card server.
Figure 5B:
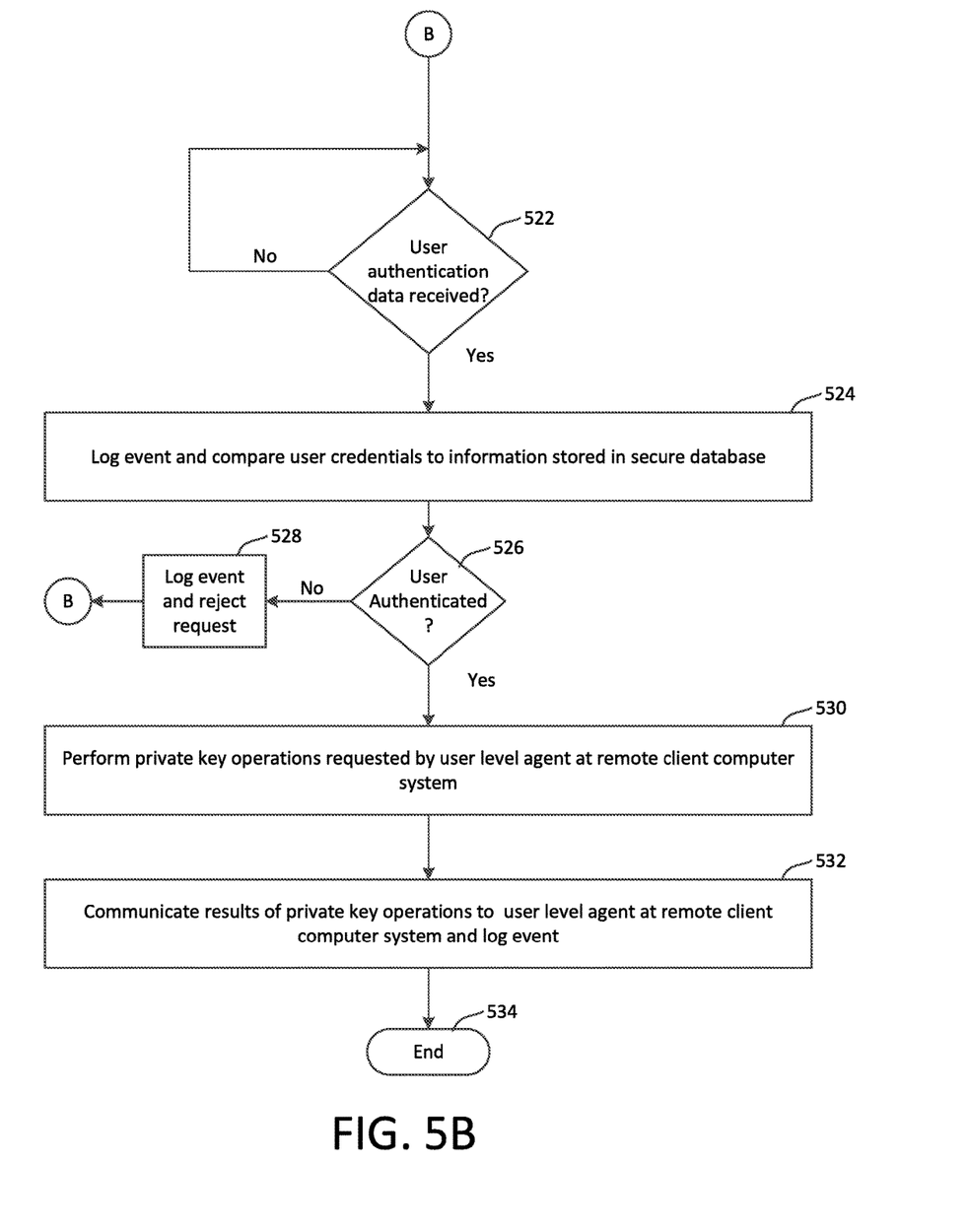

Further, it may be noted that the process disclosed with respect to FIGS. 3-5 has been described in the context of using one or more virtual smart cards when the user is already logged in to the remote client computer system. However, it should be appreciated that the methods and systems described herein can be extended to the log-in process as well. For example, a custom device connected to a secured client computer could use a biometric scan and a password prompt. This combination is an unusual authentication option for most operating systems, but the embodiments described herein can make this process appear more like a standard smart card log on.

With the system and methods described herein, the user is allowed to use one or more private keys associated with one or more virtual smart cards, but never allowed direct access to such information. Each use of the one or more private key is delegated to the VSS. The VSS is therefore able to create secure audit logs of every use of each private key associated with a particular virtual smart card. Further, if the need arises, an administrator can immediately instruct the VSS to terminate a particular user's access to one or more virtual smart card/private keys. There is no need to collect the physical smart card(s) from the employee and there is no delay in revoking their ability to use the smart card(s). In the event that a new (or even a temporary) smart card needs to be issued to a user, the process can be immediately effected by a VSS administrator and the virtual smart card can be virtually accessed by the user immediately.

A further advantage of the system described herein is that the system level agent, the user level agent and the VSS can respectively apply a different flexible set of security policies tailored to use of each virtual smart card to which the user is permitted access. These policies which are applied at each of the system level agent, user level agent and the VSS can be selectively applied independently of the policies that are applied by each of the other entities which are involved in the process.

Also, since there is no actual physical token required when using a virtual smart card, there is no opportunity for the end user to lose or forget such token. The certificate that authorizes a particular transaction is therefore decoupled from the user's identity. In order to better appreciate this advantage, consider an exemplary use case involving a group of security auditors. Assume that the auditors work in shifts to review documents. In such a scenario, an authority would either need to give each auditor their own card, or they would have to share one card which is physically handed to the next auditor at the end of a shift. Neither of these systems is particularly satisfactory. The presence of many smart cards means increased opportunity for loss or misuse. But sharing one smart card is problematic—particularly if two people work at the same time, or work in different locations. As multiple users can access the same VSS, the VSS can provide the same smart card to multiple users at the same time Similarly, there is no longer a need for a particular vendor's smart card reader hardware which is a serious limitation on some mobile devices such as phones. Not requiring hardware also reduces the cost of purchase and ownership for such systems.

Finally, by moving away from software provided by individual proprietary smart card vendors, the virtual smart card solution described herein allows customization of the prompts that the user sees, and more flexible authentication options. The prompts and authentication options become independent of the version of smart card middleware drivers that will be supplied by the smart card manufacturers. In particular, control is provided over which applications prompt the users for what proof of identity and how often. In contrast, hardware solutions tend to have restrictive hard-coded requirements such as: "any application on any computer can use this, as long as the user enters a 4 digit PIN, repeatedly every time they perform an action."

Embodiments of the inventive arrangements disclosed herein can be realized in one computer system. Alternative embodiments can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Figure 6:
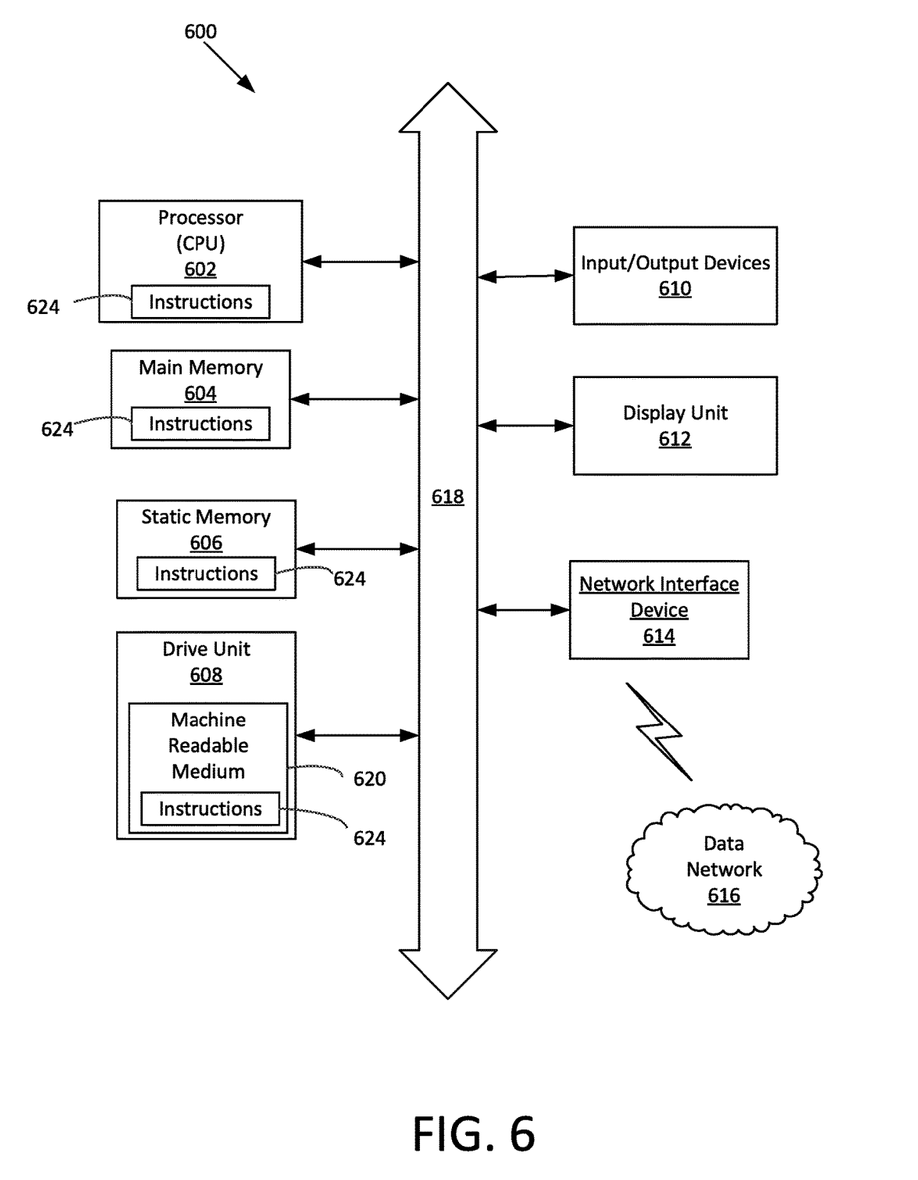
FIG. 6 is a hardware block diagram which is useful for understanding an arrangement of an exemplary computer system.

Referring now to FIG. 6, there is shown a hardware block diagram which is useful for understanding an arrangement of a machine comprising an exemplary computer system 600. The machine can include a set of instructions which are used to cause the computer system to perform any one or more of the methodologies discussed herein. In a networked deployment, the machine can function as a server or a client machine. In one or more embodiments, the exemplary computer system 600 can correspond to each of the secured computer systems $106_1$-$106_n$ and/or to the VSS 102. In some embodiments, the computer 600 can operate independently as a standalone device. However, embodiments are not limited in this regard and in other scenarios the computer system can be operatively connected (networked) to other machines in a distributed environment to facilitate certain operations described herein. Accordingly, while only a single machine is illustrated it should be understood that embodiments of the invention can be taken to involve any collection of machines that individually or jointly execute one or more sets of instructions as described herein.

The computer system 600 is comprised of a processor 602 (e.g. a central processing unit or CPU), a main memory 604, a static memory 606, a drive unit 608 comprised of machine readable media 620, input/output devices 610, a display unit 612 (e.g. a liquid crystal display (LCD), a solid state display, or a cathode ray tube (CRT)), and a network interface device 614. Communications among these various components can be facilitated by means of a data bus 618. One or more sets of instructions 624 can be stored completely or partially in one or more of the main memory 604, static memory 606, and drive unit 608. The instructions can also reside within the processor 602 during execution thereof by the computer system.

The input/output devices 610 can include a keyboard, a mouse, a multi-touch surface (e.g. a touchscreen), a microphone, a camera and so on. In the case of secured computer systems $106_1$-$106_n$, the input/output devices can further include one or more biometric capture devices that are suitable for capturing user biometric information. Such user biometric information can comprise user authentication information. Such information can be used by the secured computer system $106_1$-$106_n$, to facilitate an initial log-in by a user to the secured computer system. Alternatively, such information can be used for authentication of the user to the VSS. For example, the user biometric information can be communicated to a VSS to authenticate a user as part of a request for a private key operation. Likewise, the input/output devices 610 in such scenarios can include a physical smart card reader which is capable of reading information contained on a physical smart card presented by the user. The information contained on the smart card can be used to facilitate a user log-in to the secured computer and/or as user authentication information when a private key operation is requested.

The network interface device 614 can be comprised of hardware components and software or firmware to facilitate wired or wireless network data communications in accordance with a network communication protocol utilized by a data network 616.

The drive unit 608 can comprise a machine readable medium 620 on which is stored one or more sets of instructions 624 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EE-PROM)) and flash memory devices. A tangible medium as described herein is one that is non-transitory insofar as it does not involve a propagating signal.

A computer system as referenced herein can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. Further, while a single computer is illustrated, the phrase "computer system" shall be understood to include any collection of computing devices that individually or jointly execute a set (or multiple sets) of instructions to perform any one or more of the methodologies discussed herein.

Accordingly, computer system 600 should be understood to be one possible example of a computer system which can be used in connection with the various embodiments. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Those skilled in the art will appreciate that the computer system architecture illustrated in FIG. 6 is one possible example of a computer system. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a machine-readable storage medium and are configured for running on a computer processor. Furthermore, software implementations can include, but are not limited to, distributed processing, component/object distributed processing, parallel processing, virtual machine processing, which can also be constructed to implement the methods described herein. In the various embodiments of the present invention a network interface device 614 connected to a network environment communicates over the network using the instructions 624.

While the machine-readable storage medium 620 is shown in an exemplary embodiment to be a single storage medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any tangible medium that is capable of storing, encoding or carrying a set of instructions for execution by the machine and that cause the machine to perform any one or more of the methodologies of the present disclosure.

The term "machine-readable storage medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a machine-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for controlling use of a private key in the context of a public key infrastructure (PKI) scheme, comprising:
   storing a plurality of private keys respectively assigned to virtual smart cards in a secure data store which is accessible only to a virtual smart card server (VSS);
   using a system level agent at a client computer machine remote from the VSS to initiate a machine authentication protocol of the client computer machine at the VSS to establish the client computer machine to the VSS as a trusted computer system;
   in response to receiving a request for a private key operation at a user level agent of the client computer machine, obtaining a user authentication information from the user;
   causing the user level agent to negotiate with the system level agent to obtain a cookie authorizing the private key operation from the VSS, prior to when the user is authenticated based on the user authentication information;
   initiating a request from the user level agent to the VSS for a private key operation;
   communicating the user authentication information and the cookie from the user level agent to the VSS as part of the request;
   in response to the request, selectively performing at the VSS a private key operation requested by the user level agent using a private key assigned to one of the virtual smart cards issued to at least the user.

2. The method according to claim 1, further comprising communicating the results of the private key operation from the VSS to the user level agent.

3. The method according to claim 2, further comprising providing the results of the private key operation to an application program executing on said client computer machine.

4. The method according to claim 1, further comprising receiving the request for the private key operation at the user level agent from an application program executing on the client computer machine.

5. The method according to claim 1, further comprising limiting the use of the cookie at the VSS so that the cookie is valid only one time at the VSS for allowing the performance of the private key operation.

6. The method according to claim 1, further comprising selecting the private key operation performed at the VSS to include generating a secured hash of signed or decrypted data which has been communicated to the VSS.

7. The method according to claim 1, wherein the user authentication information is comprised of one or more elements selected from the group consisting of a password, a user biometric data, and data obtained from a physical smart card.

8. The method according to claim 7, wherein the method further comprises capturing the user authentication information by using at least one of a biometric data capture device and smart card reader device.

9. The method according to claim 1, further comprising selectively applying at the user level agent, the system level agent and the VSS a predetermined security policy determined in accordance with a particular private key for which use is being requested.

10. The method according to claim 1, further comprising recording in a secure data log at the VSS information concerning each action requesting performance of a private key operation.

11. A method for controlling use of a private key in the context of a public key infrastructure (PKI) scheme, comprising:
storing a plurality of private keys respectively assigned to virtual smart cards in a secure data store which is accessible only to a virtual smart card server (VSS);
receiving at the VSS a request to establish a client computer machine remote from the VSS as a trusted computer system, said request initiated by a system level agent at the client computer machine in accordance with a predetermined machine authentication protocol;
receiving at the VSS a request for a cookie from the system level agent, prior to when a user of the client computer machine is authenticated;
providing the requested cookie to the system level agent;
receiving at the VSS a request from a user level agent for a private key operation, where the cookie and selected user authentication information obtained by the user level agent from the user comprise part of the request; and
in response to the request, selectively performing at the VSS the private key operation requested by the user level agent by using a private key assigned to one of the virtual smart cards issued to at least the user.

12. A virtual smart card system, comprising:
a first computer machine comprising a virtual smart card server (VSS) which controls access to content respectively associated with a plurality of virtual smart cards;
one or more second computer machines disposed remote from the VSS, each comprising a client computer system including a system level agent which initiates a machine authentication protocol of the client computer machine at the VSS to establish the client computer machine to the VSS as a trusted computer system;
a user level agent at the client computer system which receives a request for a virtual smart card operation initiated by at least one application program of the client computer machine;
wherein the user level agent is responsive to the request to cause the client computer system to
obtain from a user of the client computer system a user authentication information necessary to permit use of the virtual smart card operation;
negotiate with the system level agent to obtain a cookie from the VSS, prior to when the user is authenticated based on the user authentication information;
initiate a request to the VSS for performing the virtual smart card operation, and
communicate the user authentication information and the cookie to the VSS as part of the request; and
wherein the VSS is responsive to the request by selectively performing the virtual smart card operation if a security policy applicable to the requested virtual smart card operation is satisfied.

13. The virtual smart card system according to claim 12, wherein the VSS is configured to communicate the results of the virtual smart card operation to the user level agent.

14. The virtual smart card system according to claim 13, wherein the user level agent is configured to provide the results of the virtual smart card operation to the application program which initiated the request for the virtual smart card operation.

15. The virtual smart card system according to claim 12, wherein the VSS is configured so that the cookie is valid for only a single virtual smart card operation at the VSS.

16. The virtual smart card system according to claim 12, wherein the virtual smart card operation is a private key operation performed at the VSS, and the VSS is configured to generating a secured hash of signed or decrypted data which has been communicated to the VSS.

17. The virtual smart card system according to claim 12, wherein the user authentication information is comprised of one or more elements selected from the group consisting of a password, a user biometric data, and data obtained from a physical smart card.

18. The virtual smart card system according to claim 17, wherein the client computer system is configured to capture the user authentication information by using at least one of a biometric data capture device and smart card reader device.

19. The virtual smart card system according to claim 12, wherein each of the user level agent, the system level agent and the VSS are configured to selectively apply a predetermined security policy determined in accordance with a particular virtual smart card for which use is being requested.

20. The virtual smart card system according to claim 12, wherein the VSS is configured to record in a data log information concerning a plurality of events pertaining to each request for a virtual smart card operation.

* * * * *